E. B. THURSTON.
PROGRESSIVE MANUFACTURE CONVEYER.
APPLICATION FILED SEPT. 3, 1918.
1,352,928.
Patented Sept. 14, 1920.
3 SHEETS—SHEET 1.
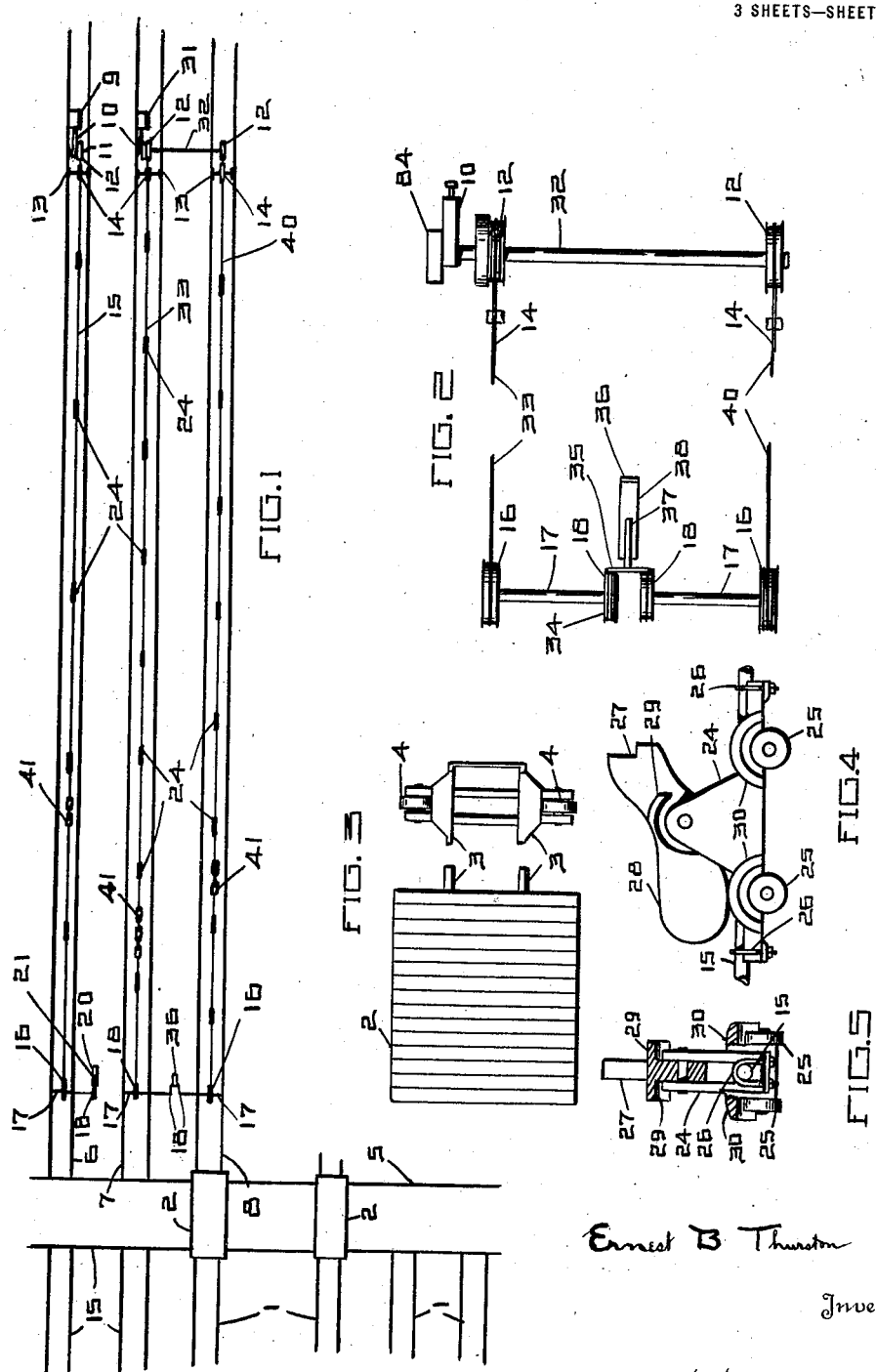
Ernest B Thurston
Inventor
By Geo E Kirk
Attorney E. B. THURSTON.
PROGRESSIVE MANUFACTURE CONVEYER.
APPLICATION FILED SEPT. 3, 1918.
1,352,928.
Patented Sept. 14, 1920.
3 SHEETS—SHEET 2.
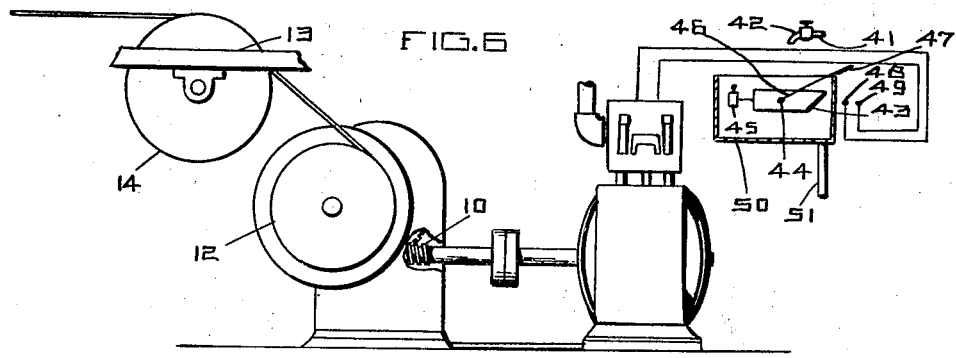
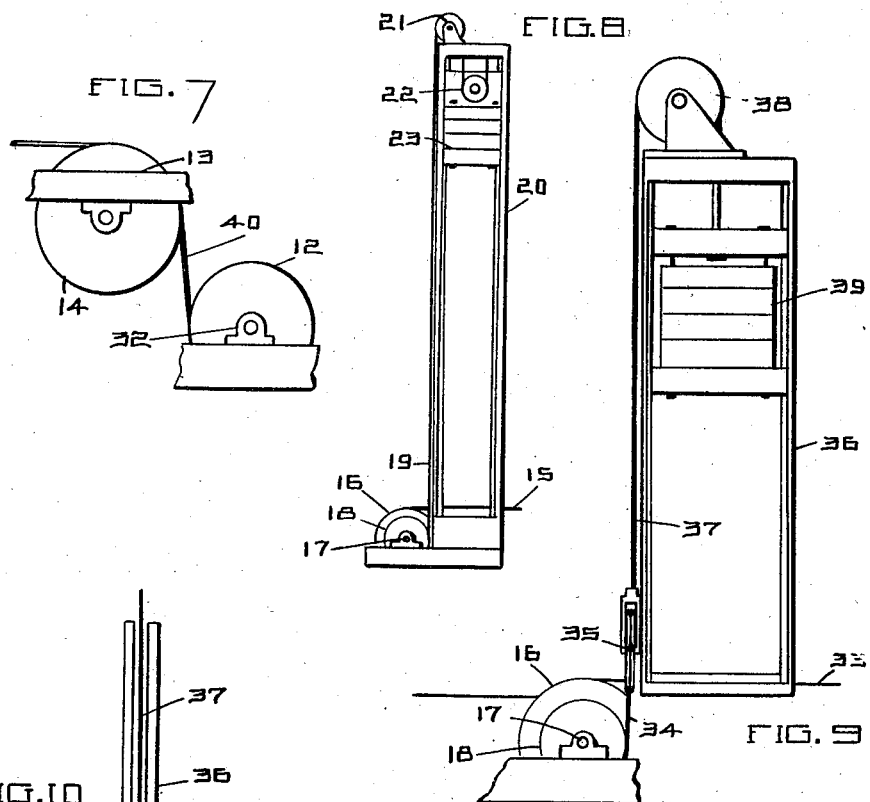
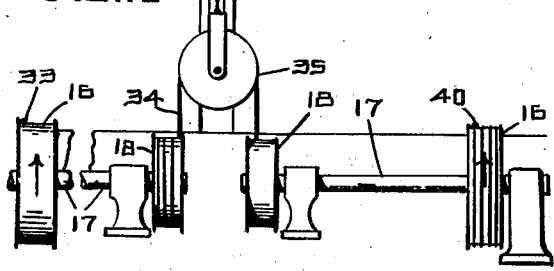

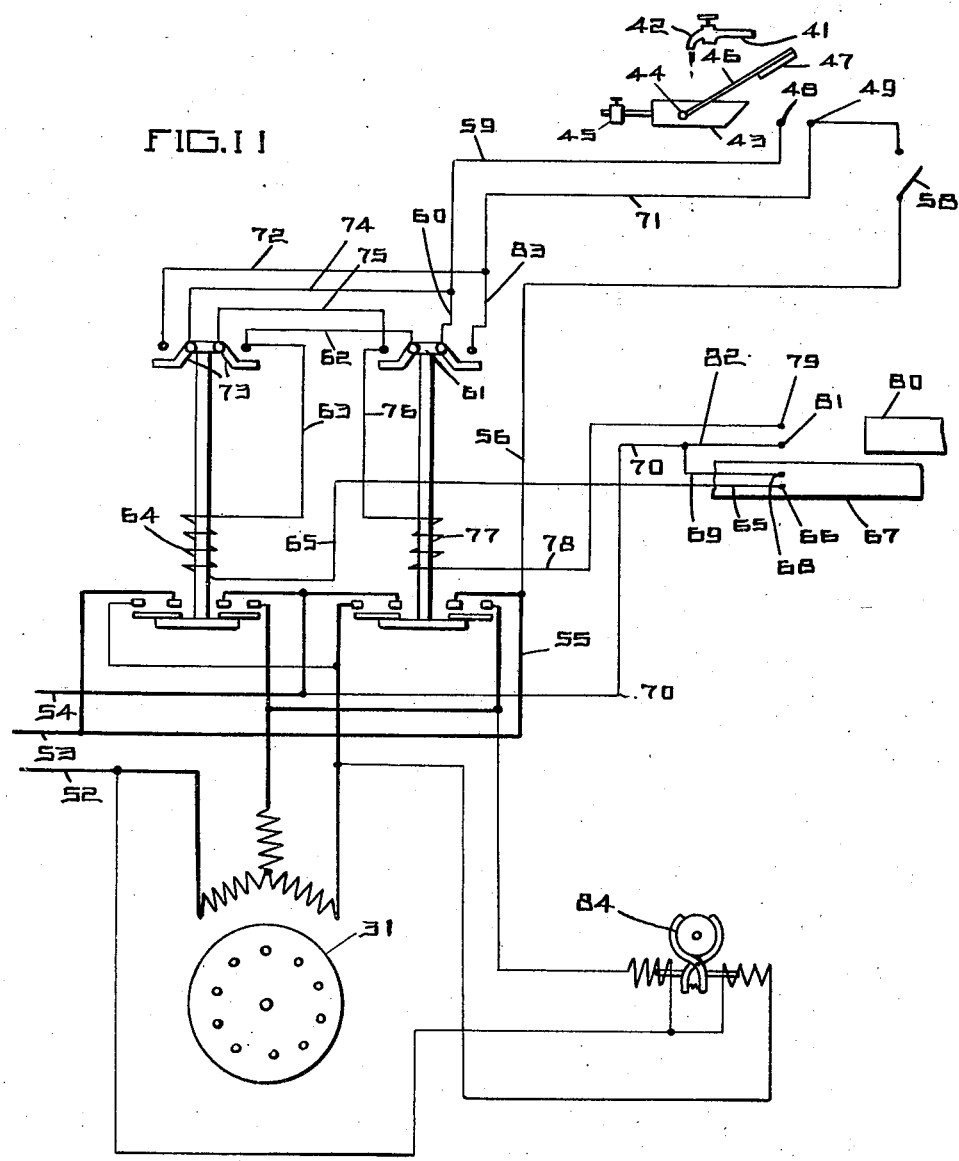

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

PROGRESSIVE MANUFACTURE CONVEYER.

1,352,928. Specification of Letters Patent. Patented Sept. 14, 1920.

Application filed September 3, 1918. Serial No. 252,489.

*To all whom it may concern:*

Be it known that I, ERNEST B. THURSTON, of Toledo, Lucas county, Ohio, a citizen of the United States of America, have invented new and useful Progressive Manufacture Conveyers, of which the following is a specification.

This invention relates to progressing material or moving vehicles, especially for definitely timed intervals.

This invention has utility when incorporated in a conveyer for the so-called progressve or continuous manufacture, as of motor vehicles.

Referring to the drawings:

Figure 1 is a fragmentary plan view of an installation embodying the invention as adapted to the progressive manufacture of motor trucks;

Fig. 2 is a fragmentary plan view of the intermittent drive device or cable system for the double runway unit of the installation;

Fig. 3 is a fragmentary plan view of a transfer table for effecting deliveries to the various runways;

Fig. 4 is a side elevation of a one-direction engaging means or dog for coacting with a truck chassis automatically;

Fig. 5 is an end view of the dog of Fig. 4, portions being broken away;

Fig. 6 is a view of the actuator, in this instance shown as an electric motor with speed reduction connections therefrom, with the automatically timed control therefor;

Fig. 7 is a view of actuator drum and coacting guide sheave as an operating connection for the second reach, the first of which may be on the same shaft as shown in Fig. 6;

Fig. 8 is a side elevation of the recover or idle travel effecting counterweight for the single runway unit;

Fig. 9 is a side elevation of the counterweight or taut maintaining connection between the ways of a double runway unit;

Fig. 10 is a fragmentary elevation of the device of Fig. 9, looking from the left in Fig. 9; and Fig. 11 is a wiring diagram of the electrical connections coacting for the automatic control in intermittent driving.

In continuous manufacture of heavy or large articles, as an instance, truck chassis work, such may conveniently be moved about on wheels. Assuming such preliminary assembly as occurring on a plurality of ways 1 (Fig. 1), when ready for the progressive treatment of the particular runway herein disclosed, the vehicles may be shifted from the ways 1 to a transfer truck having a deck 2 in the plane of the ways 1, so direct shifting of the vehicles may be had from the ways 1 to the truck deck 2. This deck 2 (Fig. 3) is supported by chassis or running gear 3 having the wheels 4 thereof transversely disposed. Accordingly the transfer truck travels in the way 5 across the ends of the several ways 1 to receive vehicles from the several ways 1 for delivery to runways 6, 7, 8, of such number as may be desirable in the installation.

The runway 6 is shown as of the single reach unit type having an electric motor 9 operating through speed reduction gearing 10 to rotate shaft 11 carrying drum 12 dropped slightly below frame 13 carrying guide pulley 14 for the intermittent drive device or flexible cable 15 extending thereover from the drum 12.

The drum 12 as an actuator for the flexible line 15, may serve to operate the drive device by pulling in on said line 15. The line 15 extends away from the actuator along the way 6 to adjacent the transfer way 5 to unwind from drum 16 on shaft 17 (Fig. 8). Also mounted on the shaft 17 is a drum 18 having cable 19 wound thereon oppositely to the winding of the cable 15 about the drum 16. This cable 19 extends upwardly adjacent guide frame 20 over fixed pulley 21 at the top of the frame 20, and thence downward with a bight about a pulley 22, the end of the cable 19 being then fast in the top of the frame 20. The pulley 22 is mounted with a series of counterweights 23 vertically movable in the guide frame 20. Accordingly, when the drive actuation of the line 15 is toward the actuator and thus to unwind the line 15 from the drum 16, the cable 19 is wound on the drum 18. With the release of the electric motor 9 from driving actuation, the drum 12 upon which the cable 15 has just been wound, is free. The counterweights 23 now acting through the cable 19 may at once and automatically reset the cable 15 to its former starting position, so that upon a repetition of the short interval drive of the electric motor 9 in the same direction, the same point on the line 15 will begin its wrapping about the drum 12, while the amount wound thereon will be definite, say 22 ft.

The counterweights 23 are adjusted, not only to maintain the cable 15 taut, but to bring about the idle or recover travel of the line or cable 15. The automatic accomplishment of this recover stroke as idle, and thus attaining the single direction travel for the material or vehicles is effected by gravity dogs (Figs. 4, 5). Blocks 24 carried by rollers 25 are fixed to travel with the cable 15 by clamps 26. Pivotally carried for one direction engagement, say with the rear axle of a truck chassis, is a dog having the upstanding work engaging portion 27 and the weighted gravity portion 28. Shields 29 protect the dog bearings and shields 30 protect the bearings for the rollers 25, and have special utility when the progressive manufacture involves say steam or gasolene washing, priming, color varnishing, finish varnishing, baking, and final assembly operations. In the recover travel of the line 15, the dog portion 27 at once moves away from engagement, and while normally held upward by the opposite gravity portion 28, the dog is free to tilt in passing under an axle in its travel away from engagement position. However, at once on the forward travel, the dog is in position for material actuation or engagement in effecting the step travel forward as desired in the timing of the manufacturing operations. Thus there is automatic engagement and automatic disengagement according to the direction of travel of the cable 15.

Instead of the single reach unit of the way 6, the ways 7, 8, are interconnected. The motor 31 is connected through speed reduction gearing 10 to rotate shaft 32 having a drum 12 thereon at the runway 7 and another drum 12 thereon at the runway 8. From the durm 12 at runway 7 extends intermittent drive device or cable 33 first upward over the guide pulley 14 carried by the frame 13, thence along the way 7 away from this actuator drum 12. Near the transfer way 5, the flexible line or cable 33 passes about drum 16 on the shaft 17, which shaft 17 also carries a drum 18. Fixed to this drum 18 (Figs. 1, 9,) is a cable 34 wound thereon oppositely to the wind of the cable 33 about the drum 16 (Fig. 10). This cable 34 has an upwardly extending bight passing about pulley 35, thence down about a drum 18 with the same direction of wind as about the other drum 18 upon which the cable 34 is wrapped. The pulley 35 is mounted for vertical reciprocation in the guide frame 36, being normally urged upward by cable 37 passing over guide pulley 38 at the top of the frame 36, and thence downward to engage counterweights 39 vertically slidable in the guide frame 36, as a means for maintaining the drive lines taut, equalizing tension therebetween, and through the cable 34 acting as a transmission connection for effecting recover or idle travel of line 40 in the way 8. This line 40 connected to the second drum 12 on the shaft 32, passes upward over the guide pulley 14, thence along the way 8 to a drum 16 on shaft 17 carrying the drum 18 to which the cable 34 extends. As the cable 34 is wound upon the drum 18 as operated by the cable 33 being wound on its drum 12, the cable 34 in unwinding from the other drum 18, winds the cable 40 on the drum 16.

For effecting the one way material progress, in this instance toward the actuator drums 12, and in separate runways, the cables 33, 40, may have clamped thereto, material engaging blocks 24, which may be spaced apart as desired, say with the desired clearance between truck lengths to permit closing of the baking ovens.

In order that the spacing may be maintained and the intermittent pull-ups may be accurate as to the several stations along the ways, the cables 15, 33, 40, may have chain sections 41 therein, from which links may be taken as stretch of the cables render desirable, while further adjustment, say for even different length or character of material may be made by shifting the blocks 24, by merely re-clamping such blocks in the changed position.

While the motor 9 may be a single direction drive, the motor 31 may be reversible, and thus in oppositely driving at each operation, there is first a winding of the line 33 upon the drum 12 as to the runway 7, and next a winding of the cable 40 on the drum 12 as to the runway 8. While the two operations of the motor 31 may occur at one starting to approximate the pulling ahead as occurring one right after the other, there may be an adaptation of a single automatic timed control, instead of the interval of the runway 6, of half such interval for the ways 7, 8, so with one interval effecting travel on the way 7 and the other interval effecting travel along the way 8, there may thus be a similar total timing for each shifting on the ways 7, 8, as upon the way 1.

With the motors 9, or 31, connected up to run a definite number of rotations and then automatically stop, there being an identical recover travel distance for each line 15, 33, 40, between each material engaging travel thereof, each cable has identical starting point and finishing point for its winding up. Thus each cable has only the short desired distance travel forward, and then recovers, with no progress of the cable, but only progress of the material due to the intermittent action of the engaging blocks 24. The cables merely reciprocate the adjusted travel distance along the run ways and there is no general winding of the runway cables about the terminal drums 12 or 16.

A simple and convenient timing control, readily adjustable, may be had by providing a water supply line 41 with a spigot 42 discharging into a tank 43 having a mounting pivot 44 and an adjustable recover effecting counter weight 45. The pivot 44 may carry an arm 46 with conductor plate 47, shifted by the unbalanced self-dumping of the tank 43, to contact the terminals 48, 49, to supply current for closing the electric circuit and thus starting the electric motor. Immediately the tank 43 has dumped, the weight 45 rights the tank so it may begin filling again, and the remote control circuit for the motor is open for a repetition of the starting operation when the tank 43 is again filled. Adjustment of the weight 45 may vary the amount of water the tank will hold before dumping, while further adjustment may be had by varying the opening of the spigot 42. The spill of water from the tank 43 may be into the tank 50 for passing by waste line 51 to the sewer.

The electric reversing control for the motor 31 (Fig. 11) may for three phase alternating current involve electric current supply mains 52, 53, 54. The main 53 is connected through the lines 55, 56, and past the manually controllable switch 58 to the terminal 49 at the float time control switch. At the stop position of the motor 31, when the switch arm 46, through the conductor plate 47 closes the circuit from the terminal 49 to the terminal 48, current may flow by lines 59, 60, through plate 61, lines 62, 63, coil 64, line 65, to terminal 66 contacting limit switch contact plate 67 actuated by the motor 31, and thence through terminal 68, lines 69, 70, to the supply main 54. The circuit thus completed, energizing the coil 64, as a magnet switch, is maintained, for notwithstanding the opening of the switch 47 by the swinging back of the tank 43, there is now flow of current from the terminal 49 through lines 71, 72, plate 73 lifted by the magnet switch coil 64, to permit flow therethrough to the line 63. The automatic stopping of the motor may occur after the determined travel thereof, by the terminals 66, 68, having the connection therebetween broken, by the travel of the plate 67 in its mounting on the speed reduction gearing 10, in passing away therefrom. This actuation of the contact may be by a mechanism such as shown in U. S. Patent 1,180,600, Gate operating devices, by Frank L. Ohler, Apr. 25, 1916, Figs. 5, 6, 7.

With the motor thus automatically stopped, the refilling of the tank 43 and its automatic dumping again to close the switch 47, results in the closing of circuit through the lines 59, 74, plate 73 (which at once dropped to the position in Fig. 11 when the coil 64 became deënergized), lines 75, 76, magnet switch coil 77, and line 78 to terminal 79, at this position of the motor resting on limit switch plate 80, with flow therethrough to terminal 81, and thence by line 82, to the line 70 and main 54. This energizing of the magnet switch coil 77, throws its switch for effecting driving action by the motor 31 in the direction opposite to the driving operation effected by the switch controlled by the coil 64. This coil 77, upon throwing its switch, also throws the plate 61, so that the righting of the tank 43 does not deënergize the coil 77, for the flow therethrough is from the line 71, line 83, the plate 61, to the line 76. In this reverse travel of the motor 31, the stop is automatic as the plate 80, traveling with the plate 67, passes clear of the terminals 79, 81, deënergizing the coil 77. The motor is thus in position for the next dumping by the tank 43 to energize the coil 64 for the first-considered travel direction operation of the motor 31. Instead of any free recover or gravity action affecting the runway lines, there may be brake 84 for holding the motor 31 when not in driving operation.

What is claimed and it is desired to secure by Letters Patent is:

1. A horizontally disposed way, a drive line provided with an end, said line coacting to progress material along the way, an actuator for the line end for effecting material progress in one direction, and additional means for effecting reversal of the actuation of the line at intervals intermediate the extent of the way.

2. A horizontally disposed way, a drive line having a plurality of reciprocations in the length of the way for progressing material along the way, an actuator for the line in one direction only for effecting material progress in such direction, and means for maintaining the line taut.

3. A way, a drive line having a plurality of reciprocations in the length of the way for progressing material along the way, an actuator for the line for effecting material progress in one direction along the way, means for maintaining the line taut, and additional means for effecting recover actuation of the line.

4. A way, a drive device for progressing material along the way, an actuator for the device, and an automatic timed control for the actuator.

5. A way, an intermittent drive device for progressing material by steps along the way, including a member extending along the way, and an actuator for the member successively coacting with the member at the same starting point for definite movement thereof.

6. A horizontally disposed way, an intermittent drive device for progressing material by steps along the way, including a flexible member extending along the way, and an actuator for effecting alternate travels of the member in one direction, there being means effecting automatic recover travels of the member.

7. A pair of laterally spaced ways, an intermittent drive device connecting the ways at one end thereof, and actuating means for the device of the pair of ways at the other ends of the ways effecting driving actuation of material on the respective ways independently of engagement of material of one way by material of the other way.

8. A pair of ways, and an intermittent drive device for progressing material along the ways, there being means coacting between the material and device in one way in one direction of travel of the device, and coacting between the material and device in the other way in the other direction of travel of the device.

9. Horizontally disposed way means, a reciprocatory drive device having simultaneously oppositely movable portions along the means, and engaging means coacting between the material and device portion in one direction of movement along the way means and between the material and other device portion in the opposite direction of device movement.

10. A pair of parallel ways, a drive device connecting the ways, and means for operating the device in one direction for progressing material along one way, and in the opposite direction for progressing material along the other way.

11. A pair of parallel ways, a drive device connecting an end of one way to an adjacent end of the other way, and means for operating the device for progressing material along each way in the same direction as to the drive connected ends thereof independently of the engagement of the material of one way with the material of the other way.

12. A pair of parallel ways, a drive device connecting one end of one way with an end of the other way, and means for operating the device in one directon for progressing material along one way in one direction, and for operating in the other direction for progressing material along the other way in a single direction.

13. A pair of parallel ways, a drive device connecting one pair of adjacent ends of said ways, and independently operable actuators at each of the other ends of the ways for moving material along the ways relatively to the actuators.

14. A pair of parallel ways, a drive device connecting one pair of adjacent ends of said ways, actuators at the other pair of adjacent ends of the ways, and a control for alternately operating said actuators for moving material along the ways relatively to the actuators.

15. A pair of parallel ways, a drive device connecting one pair of adjacent ends of said ways, actuators at the other pair of adjacent ends of the ways, and an automatically timed control for alternately operating said actuators.

16. Intermittent actuator means comprising a station, a drive device comprising a plurality of reaches extending from said station, and way means along which the device, operable by the actuator means, may be effective in progressing material in one direction as to said means.

17. Intermittent actuator means comprising a station, a drive device comprising a pair of remotely connected reaches extending from said station, and way means along which the device as operated by the actuator means may be effective in progressing material in one direction as to said means.

18. Actuator means comprising a station, a drive device comprising a pair of remotely connected reaches extending from said station, means for maintaining said reaches taut, horizontally disposed way means along which the device as operated by the actuator means may be effective in progressing material toward said actuator means, and an automatic control for the actuator means.

In testimony whereof I affix my signature.

ERNEST B. THURSTON.